(12) United States Patent
Hanninen et al.

(10) Patent No.: US 9,879,704 B2
(45) Date of Patent: Jan. 30, 2018

(54) SYSTEMS AND METHODS FOR ASSEMBLING AIRCRAFT WING SKINS

(71) Applicant: The Boeing Company, Chicago, IL (US)

(72) Inventors: Bruce J. Hanninen, Renton, WA (US); Daniel T. Long, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 397 days.

(21) Appl. No.: 14/683,015

(22) Filed: Apr. 9, 2015

(65) Prior Publication Data

US 2016/0296994 A1   Oct. 13, 2016

(51) Int. Cl.
| | |
|---|---|
| *F16B 1/00* | (2006.01) |
| *B64C 3/26* | (2006.01) |
| *B64F 5/10* | (2017.01) |

(52) U.S. Cl.
CPC .................. *F16B 1/00* (2013.01); *B64C 3/26* (2013.01); *B64F 5/10* (2017.01); *B23P 2700/01* (2013.01)

(58) Field of Classification Search
CPC ...... F16B 1/00; B64F 5/10; B64C 3/26; B23P 2700/01
See application file for complete search history.

(56) References Cited

U.S. PATENT DOCUMENTS

| | | | | |
|---|---|---|---|---|
| 4,955,119 A | * | 9/1990 | Bonomi | B21J 15/10 227/58 |
| 6,796,014 B2 | * | 9/2004 | Sarh | B21J 15/10 269/21 |

\* cited by examiner

*Primary Examiner* — Richard Chang
(74) *Attorney, Agent, or Firm* — Haynes and Boone, LLP

(57) ABSTRACT

In one embodiment, a system includes a first end effector configured to press a selected area of an aircraft wing skin panel against a corresponding area of an underlying wing support structure with a downward force, drill a hole within the selected area, the hole extending through the skin panel and the support structure, and insert an elongated shaft of a fastener into the hole. The system includes a mechanism configured to locate the first end effector relative to the selected area. The system can further include a second end effector configured to press the corresponding area of the support structure against the selected area of the skin panel with an upward force that is opposite in direction to the downward force, and a mechanism configured to locate the second end effector relative to the corresponding area of the support structure.

15 Claims, 9 Drawing Sheets

FIG. 4 -Prior Art-

SYSTEMS AND METHODS FOR ASSEMBLING AIRCRAFT WING SKINS

TECHNICAL FIELD

This disclosure relates, in general, to automated aircraft manufacturing systems and methods, and more particularly, to automated systems useful for assembling upper wing skin panels of aircraft to underlying wing support structures with lockbolt fasteners and collars.

RELATED ART

The assembly of a wing of a modern commercial jet aircraft, such as the Boeing 737 "MAX," typically involves, inter alia, the attachment of the upper "skins" of the wings, i.e., thin metal or composite panels, to underlying wing structures, e.g., spars, ribs, rib ties and leading edge straps of the wing, by means of a plurality of fasteners, typically, aerospace-grade "lockbolts." Formerly, this was accomplished with the long axis of the wing disposed in an upright or vertical orientation, but more recently, has been effected with the long axis of the wing disposed horizontally, i.e., in a "Horizontal Build Line" (HBL). In either case, however, the processes involved in the attachment of the panels to the underlying structure with fasteners have heretofore been substantially manual in nature.

Thus, a conventional wing assembly procedure typically comprises at least two separate work stations or positions, viz., a first station, in which a upper skin panel is manually placed on a previously assembled underlying skeletal wing structure, or "ladder assembly," by workers situated above the wing. The workers, using drill templates and hand-held drills, then drill a plurality of holes through the panel and underlying structures at the desired fastener locations. The panel is then separated from the ladder assembly, the fastener holes in the panel and ladder assembly are deburred, and any chips generated in the interface between the panel and the underlying structure by the drilling are thoroughly removed. Sealant is applied to the structure surface and the panel is then replaced on the ladder structure in its former position, sealant is applied in the holes and the shaft of a lockbolt fastener is inserted into each through-hole. The assembly is then moved to a second work station.

At the second station, other workers, disposed below the wing and working overhead, then manually install a swaging locknut, or "collar," onto each of the fastener shafts.

While the foregoing procedures result in satisfactory wing assemblies, they are not without some drawbacks, primarily relating to the drilling of the fastener holes and the installation of the fastener collars. For example, since the drilling process is manual, the workers must bend over the edge of the wing or crawl onto its upper surface, apply the drill templates and then hand drill the fastener holes without a clamp-up of the parts. It is difficult to maintain the drill bit normal to the surface of the panels manually while drilling quality holes. Further, since the workers cannot completely close any gaps between the skin panels and the underlying wing structures using only hand drills, this procedure necessitates the added step of separating the skin panels from the underlying structure after drilling to clean the interface between the panel and the underlying wing structure, which is time consuming and adds process flow time, as it is difficult to realign the holes. Any misalignment usually results in hole damage during insertion of the fastener and a corresponding need for rework. The process also has relatively high labor content, because the existing collaring process is also effected manually, i.e., a worker must stand or sit on the floor beneath the wing and work overhead to attach each collar using a manually operated swaging tool. This is fatiguing work that is prone to part damage and worker injuries, and is performed in a separate build position downstream from the drilling and fastener insertion operation to balance work across the line.

Accordingly, what is needed is an automated system for assembling upper skin panels of aircraft wings to underlying wing support structures using lockbolt-type fasteners that eliminates the above and other drawbacks of the manually implemented drilling and collar installation processes.

SUMMARY

In accordance with embodiments of the present disclosure, automated systems and methods are provided, including a mobile automated collar installation system, for assembling upper skin panels of aircraft wings to underlying wing support structures that eliminate the drawbacks of the conventional, manually implemented processes.

In one example embodiment, a system comprises a first end effector configured to press a selected area of an aircraft wing skin panel downward against a corresponding area of an underlying wing support structure with a first force, drill a hole within the selected area, the hole extending through the skin panel and the support structure, and insert an elongated shaft of a fastener into the hole. A mechanism is provided that is configured to locate the first end effector relative to the selected area.

In another example embodiment, a system comprises an autonomous guided vehicle (AGV) configured to move over a surface disposed below an aircraft wing. A navigation system is configured to sense the position of the AGV relative to a selected position below the wing and guide the AGV to the selected position. A first end effector is disposed on the AGV and configured to press a selected area of a support structure of the wing upward against a corresponding area of a skin panel of the wing with a first force. A first positioner is disposed on the AGV and configured to sense the position of the first end effector relative to the selected area of the support structure and to locate the first end effector relative to the selected area. A second end effector is disposed on the AGV and configured to start a collar onto a lower end of a fastener located within the selected area and extending through the skin panel and the support structure, advance the collar axially along the fastener and to a position clamped against the support structure, and swage the collar so as to lock the collar in the clamped position. A second positioner is disposed on the AGV and configured to sense the position of the second end effector and locate the second end effector relative to the lower end of the fastener.

In yet another example embodiment, a method comprises using a first end effector to press a selected area of wing skin panel downward against a corresponding area of an underlying wing support structure with a first force. A hole that extends through the skin panel and the support structure is drilled within the selected area. An elongated shaft of a fastener is inserted into the hole, and a second end effector is used to start a collar of the fastener onto a lower end of the elongated shaft, advance the collar axially along the shaft and to a position clamped against the support structure, and swage the collar so as to lock the collar in the clamped position.

A more complete understanding of the aircraft skin panel assembly systems and methods of the present disclosure, as well as a realization of additional advantages thereof, will be afforded to those of skill in the art by a consideration of the following detailed description of one or more example embodiments thereof. Reference will be made to the various views of the appended sheets of drawings, which are briefly described below, and within which like reference numerals are used to identify like ones of the elements illustrated therein.

DETAILED DESCRIPTION

Figure 1A:
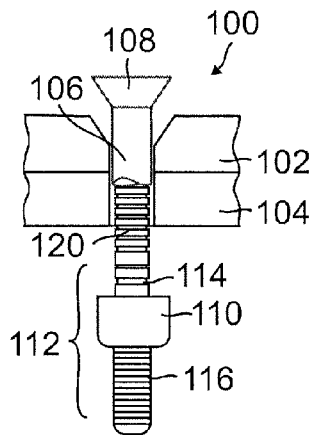
FIGS. 1A-1D are partial cross-sectional views of a first type of a typical lockbolt fastener being used to assemble an aircraft skin panel to an underlying wing structure, showing sequential steps involved in the assembly.

In accordance with embodiments of the present disclosure, automated systems and methods are provided, including a robotic mobile automated collar installation system (MACIS), for assembling upper skin panels of aircraft wings to underlying wing support structures with lockbolt-type fasteners.

FIGS. 1A-1D are partial cross-sectional views of a first type of a typical lockbolt fastener 100 currently used to assemble an aircraft skin panel 102 to an underlying wing structure 104 such as a wing rib, spar, shear tie, frame or the like, showing some sequential steps involved in the assembly. In the particular example embodiment of FIGS. 1A-1D, the fastener 100 comprises a HUCK type lockbolt fastener, but as discussed below, other types of lockbolt fasteners are also available and may be used. As can be seen in these figures, the fastener 100 comprises an elongated "pin" or shaft 106, a head 108 disposed concentrically at an upper end of the shaft 106, and a locking nut or "collar" 110. The single-piece shaft 106 and head 108 typically comprise a metal, e.g., steel, aluminum, titanium or an alloy of one of the foregoing.

In a typical wing assembly procedure, the skin panel 102 and the underlying wing structure 104 are temporarily pressed together, and a common hole is bored through the two parts. In the particular example embodiment of FIGS. 1A-1D, the head 108 of the fastener 100 is frustoconical in shape, i.e., is intended to be countersunk below the upper surface of the skin panel 102, such that the upper surface of the head 108 is disposed generally flush with the upper surface of the skin 102, for streamlining purposes, and accordingly, the formation of the fastener hole can include, or be followed by, the formation of a correspondingly shaped frustoconical counterbore in the skin 102 at the upper end of the hole. As illustrated in FIG. 1A, the elongated shaft 106 of the fastener 100 is inserted into the hole until the head 108 of the fastener 100 is seated within the corresponding counterbore, and the nut or collar 110 is then started onto the lower end of the shaft 106.

Figure 1B:
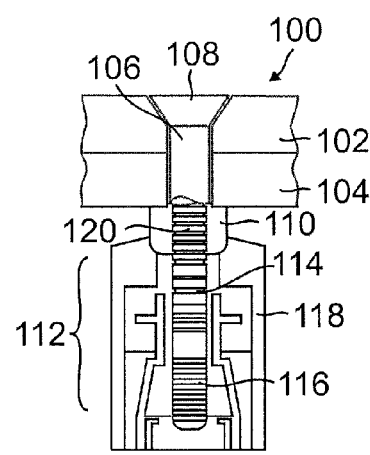

The shaft 106 of the fastener 100 includes a breakaway extension, or "pin-tail" 112, disposed at a lower end of the shaft 106 and integrally coupled thereto through a stress-raising feature 114, such as a circumferential notch or groove. The pin-tail 112 includes a series of thread-like corrugations 116 that are gripped by the jaws of an installation tool 118. During installation, the installation tool 118 pulls the pin-tail 112 axially downward relative to the collar 110, such that the collar 110 is forced axially over a second series of thread-like corrugations 120 disposed on the circumfery of an upper portion of the shaft 106 and into a compressive engagement with the lower surface of the underlying structure 104, as illustrated in FIG. 1B.

Figure 1C:
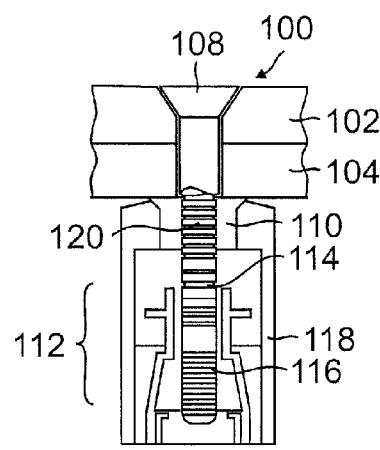
Figure 1D:
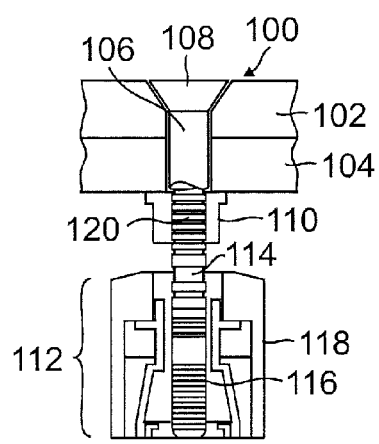

As illustrated in FIG. 1C, continued axial movement of the collar 110 relative to the fixed shaft 106 with the installation tool 118 eventually drives the upper end of the collar 110 into engagement with the lower surface of the underlying structure 104 with a predetermined amount of clamping force, at which point, the collar 110 becomes deformed, or swaged, into a locked configuration on the corrugations 120 of the shaft 106 and against the underlying structure 104, while the pin-tail 112 is simultaneously sheared away from the shaft 106 at the stress-raising feature 114 and subsequently discarded, as illustrated in FIG. 1D.

Figure 2A:
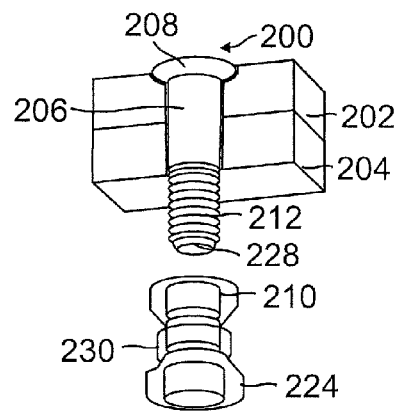
FIGS. 2A-2C are partial cross-sectional perspective views of another type of a conventional HI-LOK fastener being used to assemble an aircraft skin panel to an underlying wing structure, showing sequential steps involved in the assembly.
Figure 2B:
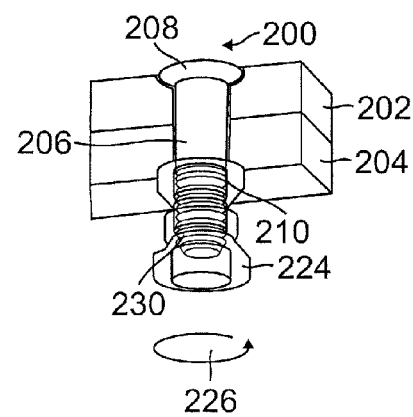
Figure 2C:
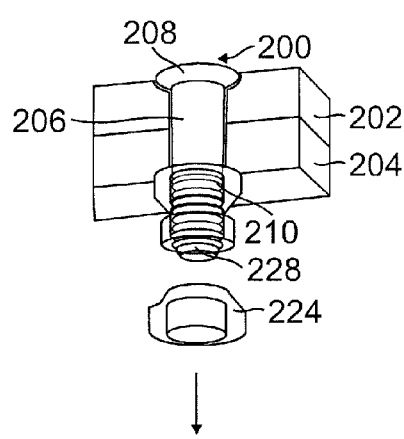

FIGS. 2A-2C are partial cross-sectional perspective views of another typical lockbolt type of fastener 200 currently in use, viz., a HI-LOK fastener, being used to fasten an aircraft skin panel 202 to an underlying wing structure 204, showing sequential steps involved in the assembly. The example HI-LOK fastener 200 includes an elongated shaft 206, a frustoconical head 208 disposed concentrically at an upper end of the shaft 206, and a collar 210 having an internal thread that engages a complementary external thread 212 disposed on a lower end portion of the shaft 206.

As illustrated in the figures, during installation, a breakaway "wrenching element" 224 disposed at the lower end of the collar 210 is engaged and rotated, as indicated by the arrow 226 in FIG. 2B, by an installation tool (not illustrated) to advance the collar 210 upward along the shaft 206 and toward a lower surface of the underlying wing structure 206, while the shaft 206 is simultaneously prevented from rotating by the engagement of the installation tool with a socket 228 disposed in the lower end of the shaft 206. The wrenching element 224, like the pin-tail 112 of the HUCK fastener 100 above, is integrally coupled to the collar 210 through a stress-raising feature 230, such as a circumferential notch or groove.

As illustrated in FIG. 2C, continued rotation of the wrenching element 224 and collar 210 relative to the fixed shaft 206 with the installation tool eventually drives the upper end of the collar 210 into engagement with the lower surface of the structure 204 with a preselected amount of clamping force, at which point, the collar 210 becomes swaged into a locked position on the threads 212 of the shaft 206 and against the underlying structure 204, while the wrenching feature 224 is sheared away from the collar 210 at the stress-raising feature 230 and subsequently discarded.

Thus, in an installed state of either of the above two lockbolt fasteners, a portion of the shaft 106 or 206 disposed between the lower surface of the head 108 or 208, and the upper end of the collar 110 or 210 is loaded in a predetermined amount of tension, while the skin 102 or 202 and the underlying wing structure 104 or 204 located between these features are pressed together by the fastener 100 or 200 with a corresponding amount of compressive force.

Figure 3:
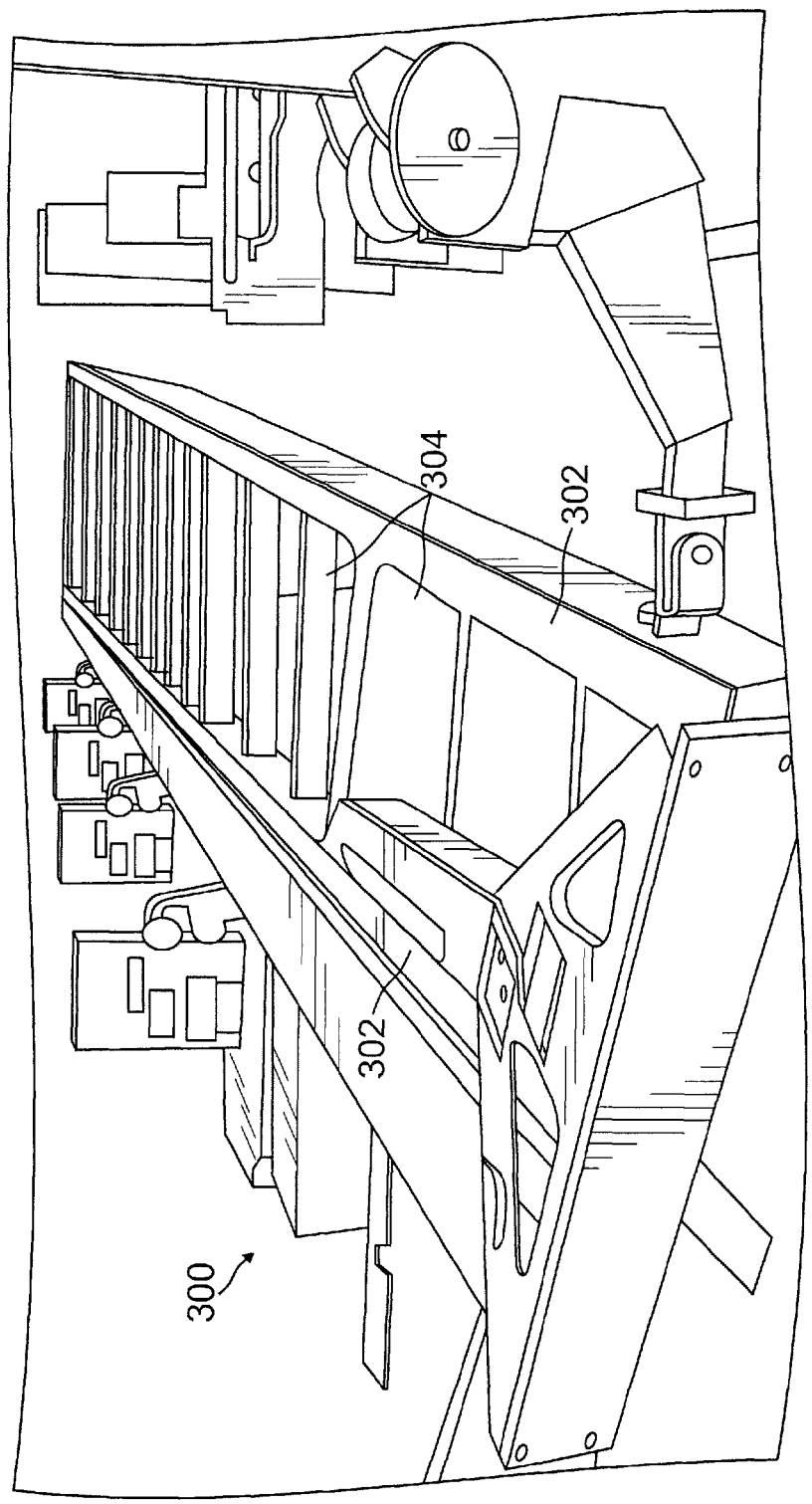
FIG. 3 is a perspective view of an upper surface of a wing "ladder assembly," comprising an assembly of the constituent structural parts of an aircraft wing, prior to the installation of skin panels thereon.
Figure 4:
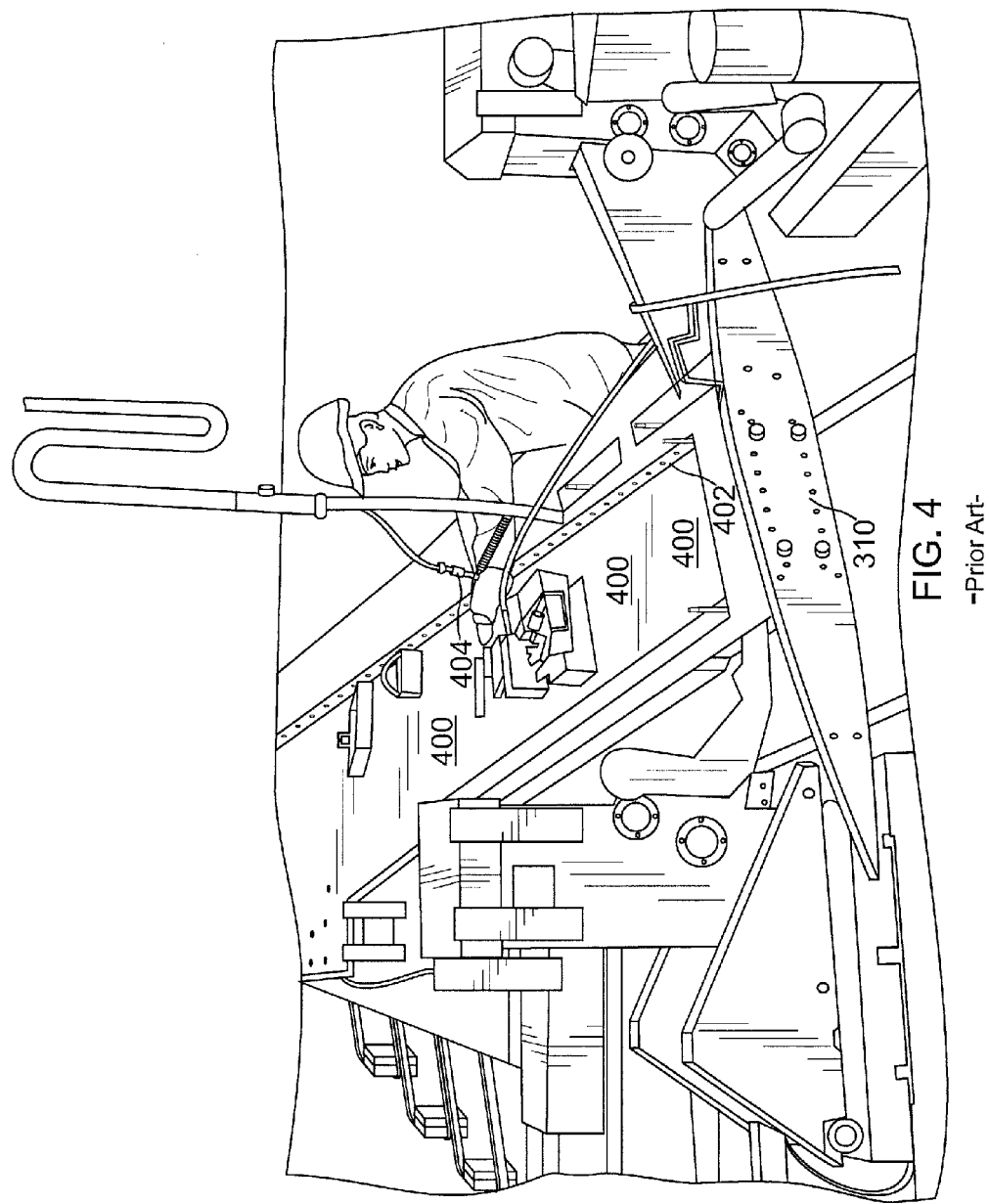
FIG. 4 is a perspective view of the upper surface of the ladder assembly of FIG. 3, showing the conventional manual installation of upper skin panels thereon.
Figure 5:
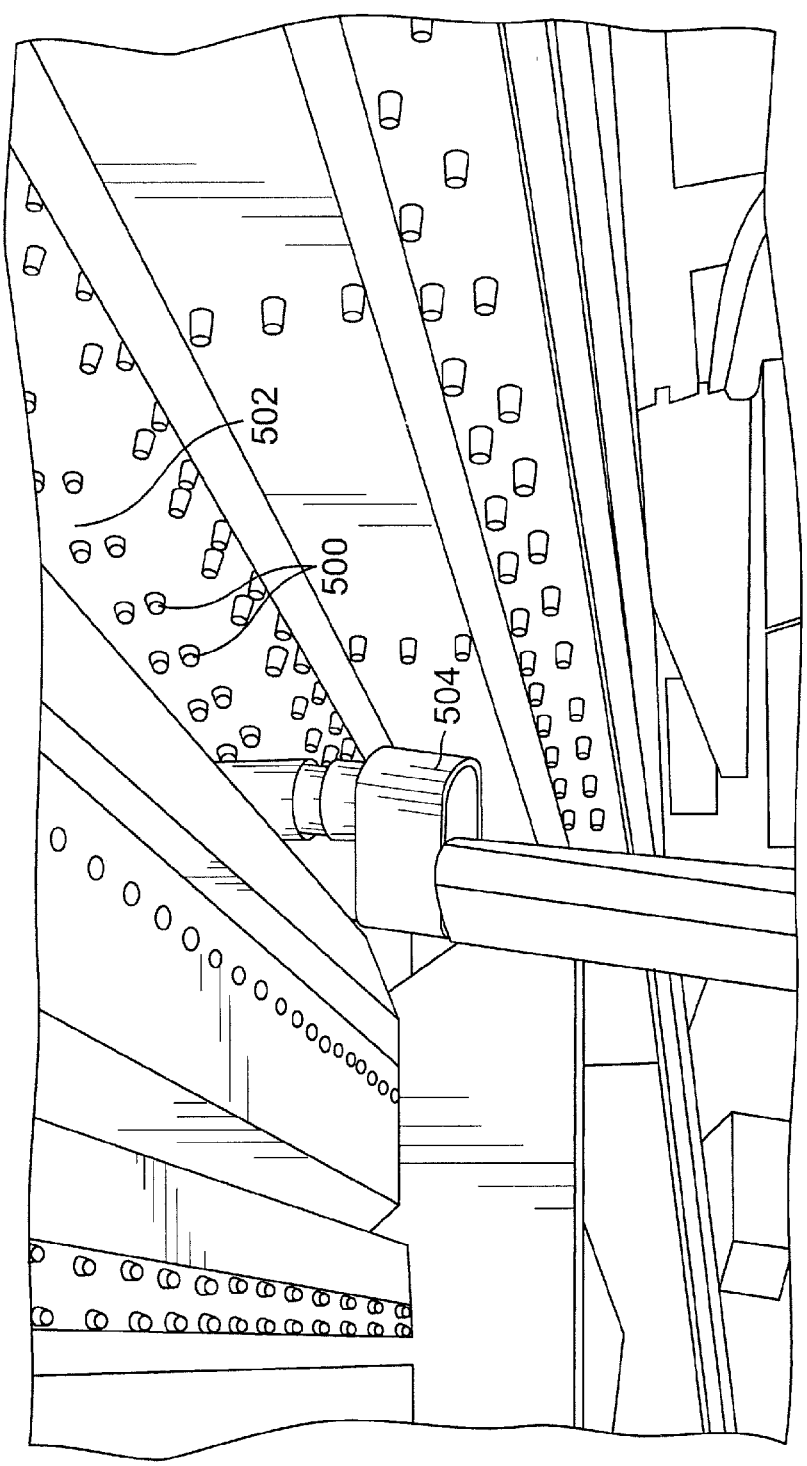
FIG. 5 is a lower perspective view of the wing assembly of FIG. 4, showing the conventional manual installation of lockbolt fastener collars onto the lower ends of fasteners extending through the upper skin panels and underlying structure of the wing.

FIG. 3 is a perspective view of an upper surface of a typical wing "ladder assembly" 300, comprising a bolted assembly of the constituent structural parts of an aircraft wing, such as the wing spars 302 and ribs 304, prior to the installation of any upper wing skin panels thereon. FIG. 4 is a perspective view of the upper surface of the ladder assembly 300, showing the conventional manual installation of upper skin panels 400 thereon. FIG. 5 is a lower perspective view of the wing assembly of FIG. 4, showing the conventional installation of lockbolt fastener collars 500 onto the lower ends of fasteners extending through the upper wing skin panels 400 and underlying wing structure 502 of the wing assembly using a manually operated collar installation tool 504.

As can be seen in the wing skin assembly processes illustrated in FIGS. 3-5, a conventional wing assembly procedure is labor-intensive, and typically comprises at least two separate work positions or stations, viz., a first station, as illustrated in FIG. 3, in which a skin panel 400 is manually placed and located on the previously assembled ladder assembly 300 of the underlying wing structure by workers bending over or lying on top of the wing assembly. The workers, using drill templates 402 and hand-held drills 404, then drill a plurality of holes through the panel 400 and underlying structures at the desired fastener locations. Because the drilling operation is implemented manually, it is difficult to maintain the drill bit normal to the surface of the skin panels while drilling holes of acceptable quality. An additional problem with manually drilling the fastener holes in the wing skin panels 400 and underlying wing structures 502 is illustrated in FIGS. 6-9.

Figure 6:
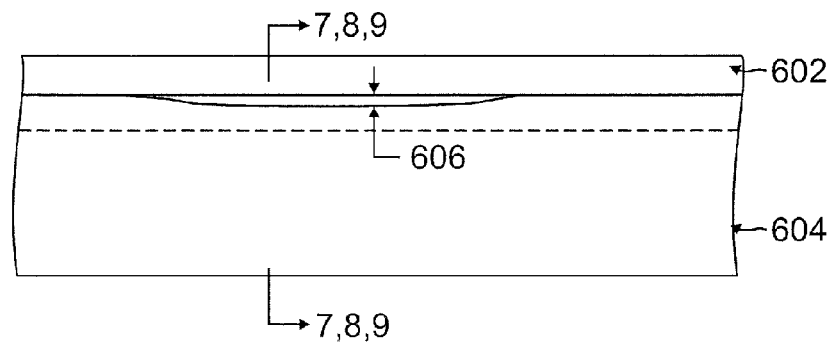
FIG. 6 is a partial side elevation view of an upper wing skin panel disposed on an underlying wing structure, showing a gap between a lower surface of the panel and an upper surface of the underlying structure.
Figure 7:
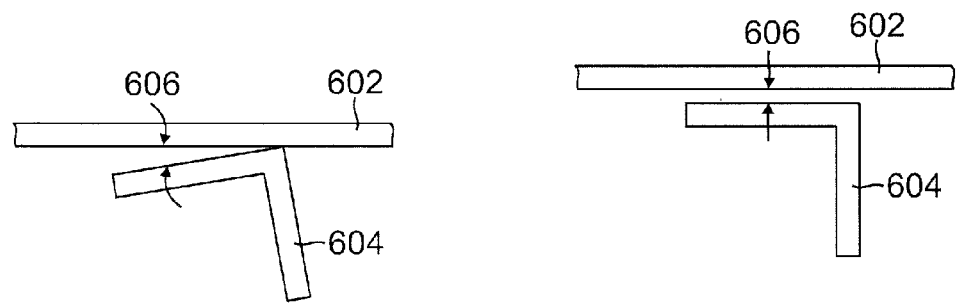
FIG. 7 is a partial cross-sectional view of the skin panel and underlying structure of FIG. 6, as seen along the lines of the section 7-7 taken therein.
Figure 8:
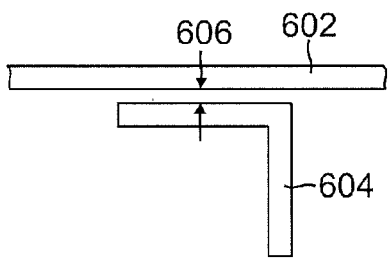
FIG. 8 is another partial cross-sectional view of the skin panel and underlying structure of FIG. 6, as seen along the lines of the section 8-8 taken therein.
Figure 9:
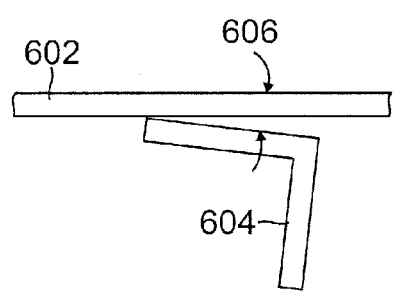
FIG. 9 is another partial cross-sectional view of the skin panel and underlying structure of FIG. 6, as seen along the lines of the section 9-9 taken therein.

FIG. 6 is a partial side elevation view of an upper wing skin panel 602 disposed on an underlying, L-shaped wing structure 604 and showing a gap 606 at a desired fastener location between a lower surface of the panel 602 and an upper surface of a right-angled flange of the underlying structure 604, which can be caused by, e.g., a buildup of manufacturing tolerances in the respective parts. As illustrated in FIGS. 7-9, the gap 604 can take a variety of shapes, depending on the shape of the underlying structure 604 and the manufacturing tolerances of the parts. For example, FIG. 7 illustrates a "toe" type of gap 606, FIG. 8 illustrates a "parallel" type of gap 606, and FIG. 9 illustrates a "heel" type of gap 606.

However, regardless of the shape of the gap 606, it is difficult or impossible for a worker to apply enough pressure to completely close the gap 606 surrounding a fastener location using only a manually operated drill. As a result, it is possible for chips, cuttings and other drilling debris to collect within the gap 606, which prevents the skin panel 602 from seating properly on the underlying structural member 606 when a fastener is installed at that location. Accordingly, before it is fastened to the underlying structure 604 with fasteners, the skin panel 602 must be separated from the ladder assembly 300, where the fastener holes in the panel 602 and ladder assembly 300 are deburred, and any chips or cutting debris generated at the interface between the panel 602 and the underlying structure 606 by the drilling are completely removed. The structure is then fay surface sealed. The panel 602 is then replaced on the ladder structure 300 in its former position, and the shaft of a lockbolt fastener is inserted into each through-hole in the panel 602.

The loose wing assembly is then moved to a second work station, where another worker, positioned below the assembly and working overhead, then installs a collar onto each of the fastener shafts protruding through the wing using a manually operated installation tool 504, as illustrated in FIG. 5 and discussed above in connection with FIGS. 1A-1D and 2A-2C.

While the foregoing procedures can result in the production of satisfactory wing assemblies, they are not without drawbacks that relate primarily to the manually implemented drilling of the fastener holes and the installation of the collars of the fasteners described above. For example, because the existing processes are effected manually, they can be fatiguing and result in incidences of worker injuries and damage to parts. It would therefore be desirable, where practical, to implement some or all of these processes with automated, precision equipment. Additionally, it would be desirable if the step of removing the drilled panels from the ladder assembly and the cleaning of chips and cuttings from the interface between them could be eliminated, such that the steps of drilling, deburring and fastener installation, including the installation of collars, could all be effected automatically and at a single work station.

Regarding the latter objective, it is known that if a wing skin panel is pressed unilaterally against an underlying wing structure at a given fastener location with sufficient force by, e.g., an automated drilling apparatus, any interfacial gap of a practical size between the panel and the structure can be temporarily closed, such that the entry of chips or cuttings into the interface during the drilling of a fastener hole at that location will be blocked. However, because of manufacturing tolerances, the thickness of the gap between the panel and the underlying structure, and hence, the force necessary to close that gap, will also vary. Thus, on one hand, if a force is applied to a skin panel that is large enough to close the largest possible gap between the panel and an underlying structure, the application of that same force at other locations where the gap is smaller could result in a marking or permanent deformation of the skin panel.

On the other hand, if the manufacturing tolerances on the panel and the underlying structure are held more closely so as to reduce the largest size of interfacial gaps, such that the same force required to close the largest possible gap by the drilling apparatus can also be applied to locations having smaller gaps without any marking or deformation of the panels, the resulting increase in the cost of manufacture of the components could exceed any benefit afforded by implementing such a drilling procedure.

Figure 10A:
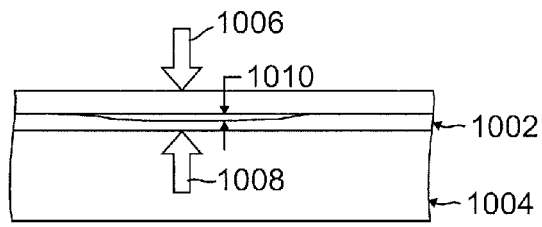
FIGS. 10A and 10B are partial side and end elevation views, respectively, of the skin panel and underlying wing structure of FIG. 6, showing a pair of oppositely directed forces acting on opposites sides the gap prior to a clamping of the parts to close the gap.
Figure 10B:
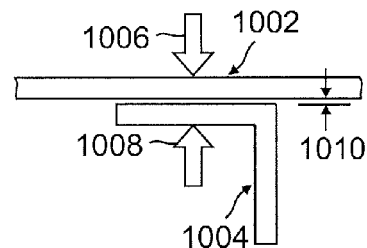
Figure 11A:
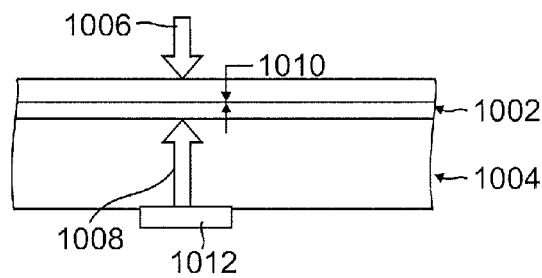
FIGS. 11A and 11B are partial side and end elevation views, respectively, of the skin panel and underlying wing structure of FIGS. 11A and 11B, showing the parts clamped together by the opposing forces so as to close the gap at their interface.
Figure 11B:
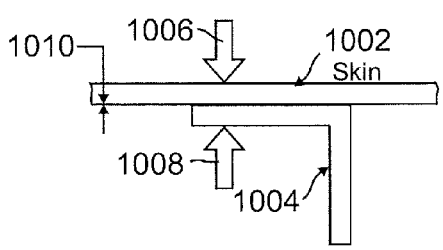

However, as illustrated in FIGS. 10A-11B, the foregoing tradeoff can be advantageously resolved by 1) the application of a bilateral clamping force to each of the fastener locations on the skin panel and the underlying wing structure, and 2) by controlling the magnitude of the clamping force to a level that is sufficient to close any interfacial gap between the panel and the underlying structure, but which is less than that which could result in any marking, detrimental deformation, pre-load, or other damage to the panel. Thus, FIGS. 10A and 10B are partial side and end elevation views, respectively, of a skin panel 1002 and an underlying wing structure 1004 showing a pair of coincident, but oppositely directed upper and lower forces 1006 and 1008, which could be generated by, for example, corresponding first and second "pushers," or "end effectors" (EEs) of a drilling apparatus, acting on opposites sides an interfacial gap 1010 between the panel 1006 and the underlying structure 1008, prior to a clamping together of the parts to close the gap 1010, and FIGS. 11A and 11B are corresponding views, showing the parts clamped together by a suitable increase in the magnitudes of the opposing forces 1006 and 1008 so as to close the gap 1010.

As illustrated in FIG. 11A, one of the pushers or EEs used to exert the clamping forces 1006 and 1008 can incorporate a sensor 1012, such as a load cell or a strain gauge, to measure the magnitude of the clamping force exerted on the skin panel 1002 and the underlying wing structure 1004 by the opposing EEs, and the output signal of the sensor 1012 can be fed back to an interactive force feedback system (IFFS) that can be used to automatically control the forces exerted by the respective EEs on the structures to a level that is sufficient to close the gap 1010 completely, but that limits the clamping forces to an upper threshold value above which damage to the skin panel 1002 could occur.

Figure 12:
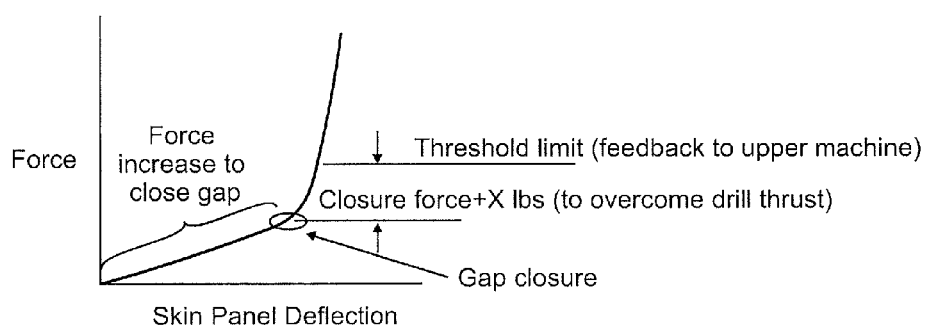
FIG. 12 is a graph representative of wing structure deflection as function of the clamping force being exerted on the skin panel and underlying wing structure of FIGS. 11A and 11B by corresponding end effectors while closing the gap at their interface.

FIG. 12 is a graph of the operation of such an IFFS when used to control the magnitudes of the clamping forces 1006 and 1008, in which the skin panel 1002 deflection is plotted as function of the clamping force exerted on the skin panel 1002 and underlying wing structure 1006 of FIGS. 11A and 11B by corresponding EEs while closing the interfacial gap 1010. As can be seen in FIG. 12, the increase in the clamping forces to produce a deflection of the skin panel 1002 relative to the underlying structure 1004 is a generally linear relationship, up to the point at which closure of the gap 1010 occurs, after which, the curve then exhibits a relatively sharp "elbow," i.e., a sudden increase in the force necessary to produce further deflection of the panel 1002. Thus, an automatic drilling apparatus incorporating such an IFFS can be programmed to sense the level of the clamping force acting on the skin panel 1002 and the underlying wing structure 1004, and based thereon, increase the force to the actual level necessary to close the gap 1010 completely, and thereafter, limit the force to a level that is at or above the closure level and below the level at which damage to the skin panel 1002 could occur.

Figure 13:
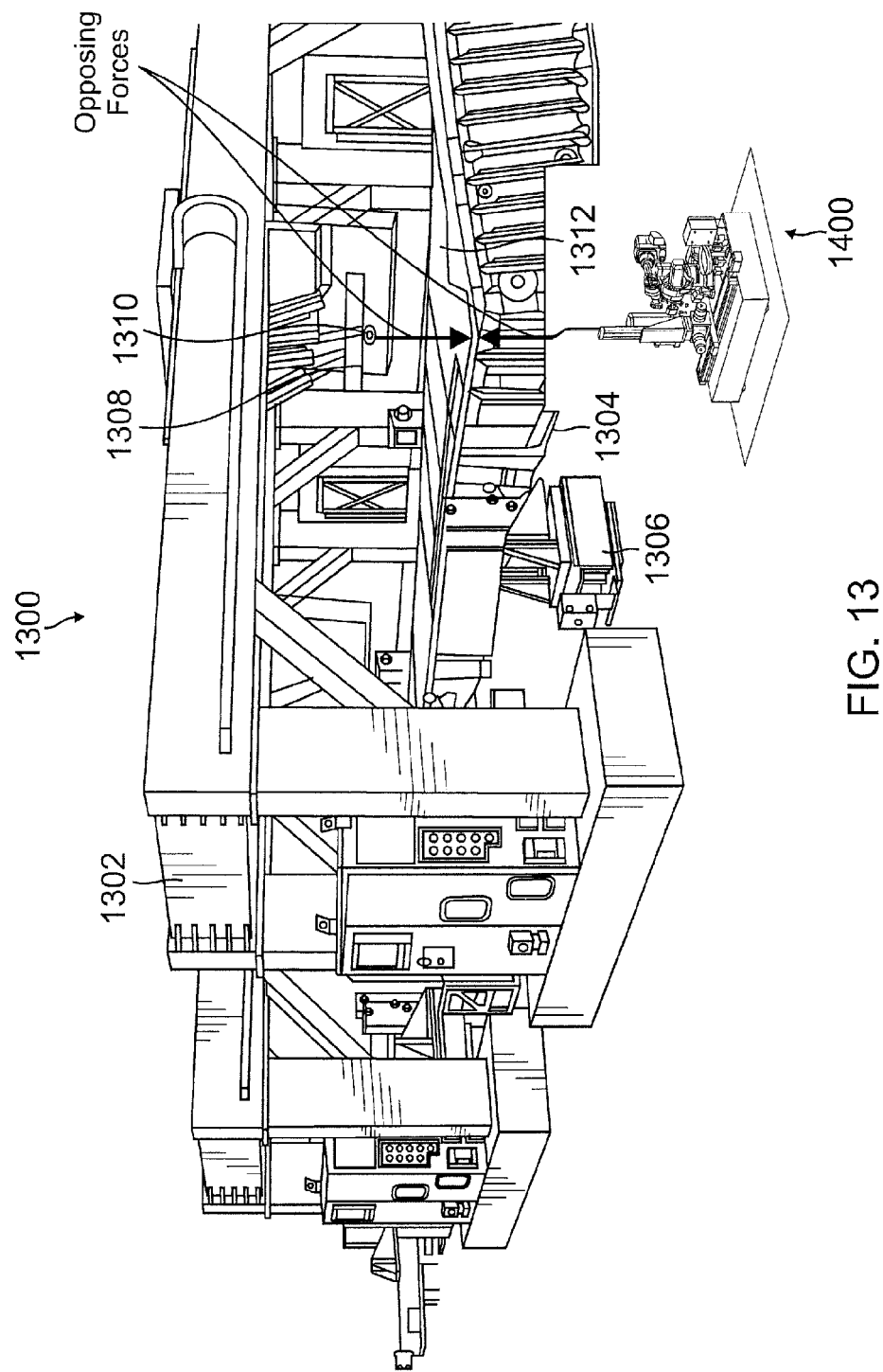
FIG. 13 is an upper, side perspective view of an example embodiment of an automatic system for assembling upper wing skin panels of aircraft to underlying wing support structures with lockbolt fasteners and collars in accordance with the present disclosure; and, FIG. 14 is an upper, side perspective view of an example embodiment of a Mobile Automated Collar Installation system in accordance with the present disclosure.

An example embodiment of an automatic system 1300 for assembling an upper wing skin panel to an underlying wing support structure and incorporating the above considerations is illustrated in the perspective view of FIG. 13. As illustrated in FIG. 13, the example system 1300 includes a positioner 1302 disposed above a wing assembly 1304 that is held in a generally horizontal orientation above a factory floor by a plurality of wing support stands 1306. The support stands 1306 are each selectably adjustable to enable a wing assembly 1304 to be supported in a wide range of working positions.

A drilling "head" 1308 is disposed below the positioner 1302 and above the wing assembly 1304 for movement relative to the positioner 1302 and the upper surface of the wing assembly 1304. A first or upper EE 1310 is disposed on the drilling head 1308 for movement relative to the drilling head 1308. In one advantageous embodiment, the first EE 1310, operating in conjunction with the programmably moveable drilling head 1308, can move the first or upper EE 1310 with six degrees of movement, i.e., ±X, ±Y, ±Z, ±$\theta_X$, ±$\theta_Y$ and ±$\theta_Z$, relative to the upper surface of the wing assembly 1304, and in particular, relative to a selected area on a skin panel 1312 within which a fastener is to be installed.

For this purpose, a mechanism for automatically locating the first EE 1310 relative to the selected area on the skin panel can be disposed on the lower surface of the drilling head 1308, or alternatively, on the first EE 1310 itself, and can comprise, for example a "vision/laser" system, i.e., a laser for illuminating tooling marks or targets disposed on, e.g., the upper surface of the skin panel 1312, and an associated vision system for detecting the illuminated tooling marks and for moving the drilling head and/or the first EE 1310 relative to them and to a selected fastener location on the skin panel 1312.

The first or upper EE 1310 is configured to carry out a plurality of functions at the selected fastener location, including 1) pressing the selected area of the skin panel downward against a corresponding area of the wing support structure with a force sufficient to close any gap between the panel and structure, 2) drilling a hole within the selected area while the gap is held closed, the hole extending through both the skin panel and the support structure, and 3) inserting the shaft of a fastener into the hole after it is drilled.

Additional functions that can be carried out the upper or first EE 1310 can include, e.g., performing a deburring operation on the upper and lower ends of each fastener hole, and measuring the hole diameter and countersink depth before inserting a fastener therein. In one possible embodiment, the upper or first EE 1310 can comprise a single, complex EE that is capable of effecting all of the foregoing functions, and in another possible embodiment, the first EE 1310 can comprise a plurality of simple EEs disposed on the drilling head 1308, each of which is capable of performing one of the foregoing functions at the selected area, and each of which is programmably moved into position relative to the selected fastener area by the drilling head 1308.

As those of some skill will understand, the automatic assembly system 1300 as described thus far is capable of solving some of the problems of the conventional manual skin panel installation procedures discussed above, e.g., eliminating the manual drilling of fastener holes and the concomitant need to disassemble the skin panels from the underlying wing structure for removal of chips and cuttings before the fasteners are inserted in those holes.

However, alone, it does not supply the advantages of providing a controllable "back-up" for the first EE 1310, as discussed above in connection with FIGS. 11A and 12, i.e., a bilateral clamping arrangement of the skin panel and the underlying wing structure that can be controlled using an interactive force feedback system (IFFS) to control the clamping force to a level sufficient to close an interfacial gap between the panel and structure before drilling, but below a level at which damage to the skin panel could occur. Additionally, it does not provide for the automatic installation of the fastener collars.

As illustrated in FIG. 13, these latter deficiencies can be eliminated by the provision within the system 1300 of a separate mobile automated collar installation system (MACIS) 1400. As illustrated in the enlarged perspective view of FIG. 14, in one possible embodiment, the MACIS 1400 includes a low-profile autonomous guided vehicle (AGV) 1402 that is configured to move over a horizontal surface 1404, e.g., a factory floor, below the wing assembly 1304 by means of, e.g., an omnidirectional drive and/or wheel system which, in one advantageous embodiment can be powered with rechargeable batteries. It can include an onboard navigation system 1406 for sensing the position of the AGV 1402 relative to a selected position below the wing assembly 1304 and for automatically guiding the AGV 1402 to the selected position, and can additionally include collision avoidance sensing and software.

Figure 14:
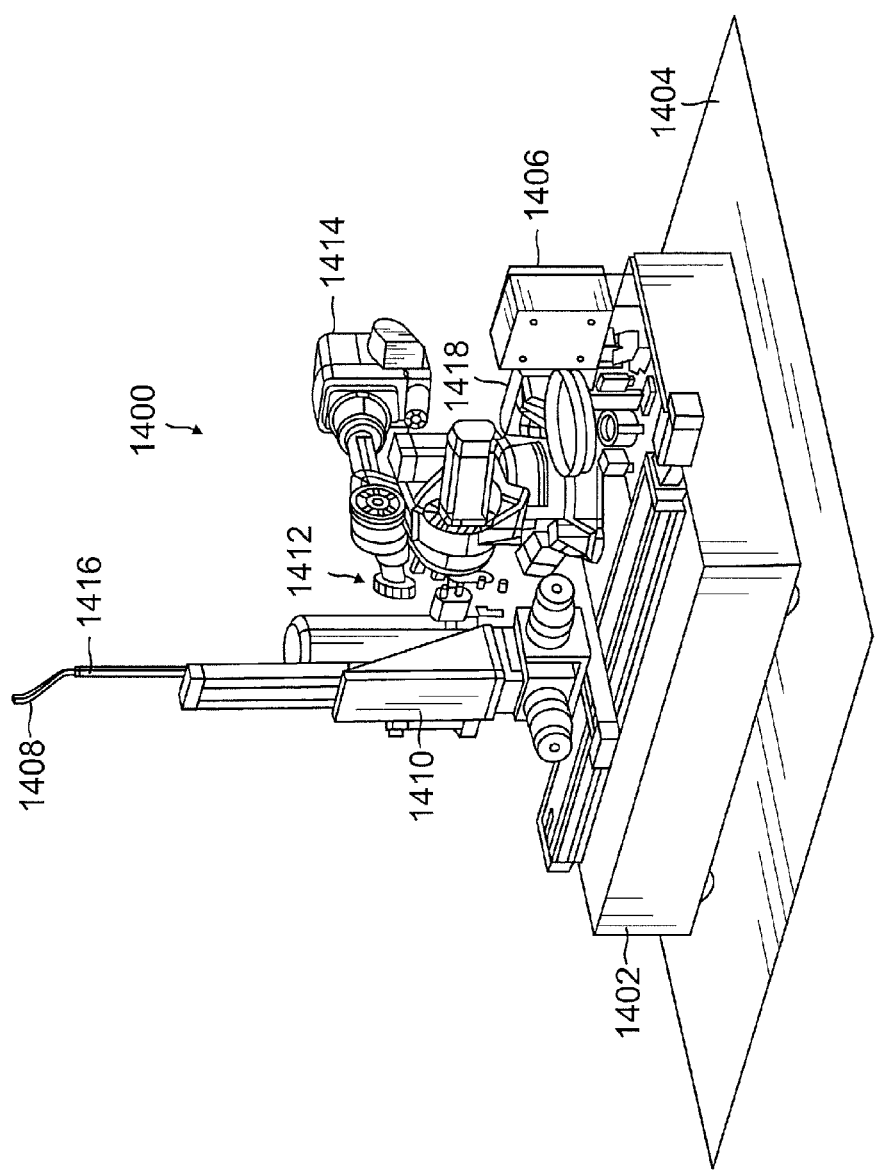

As illustrated in FIG. 14, a first lower or drill back-up EE 1408 is disposed on the AGV 1402 for pressing a selected area of a wing support structure within which a fastener is to be installed upward against a corresponding area of the adjacent skin panel with a controlled level of force. That is, the back-up EE 1408 of the MACIS 1400 functions to oppose the force exerted on the skin panel by the first or upper EE 1310 so as to achieve the bilateral clamping of the skin panel and underlying structure described above in connection with FIGS. 11A and 11B. To this end, a back-up EE positioner 1410 is disposed on the AGV 1402 that is capable of controlling the movement of the back-up EE 1408 in six degrees of motion, i.e., ±X, ±Y, ±Z, ±θ$_X$, ±θ$_Y$ and ±θ$_Z$, and which is also capable of sensing the position of the back-up EE 1408 relative to the AGV 1402 and the selected area of the support structure and for automatically locating the back-up EE 1408 relative to the selected area.

In addition to the back-up EE 1408 and its associated positioning mechanism 1410, an automatic collar installation EE 1412 is also disposed on the AGV 1402 of the MACIS 1400 that is configured to 1) start a fastener collar onto a lower end of a fastener disposed in a selected fastener area, 2) advance the collar axially along the shaft of the fastener and to a position clamped against the underlying wing support structure, as described above in connection with FIGS. 1A-1D and 2A-2C, and 3) swage the collar so as to lock it in the clamped position. Like the back-up EE 1408, the collar installation EE 1412 includes an associated collar installation EE positioner 1414 disposed on the AGV 1402 for sensing the position of the collar installation EE and for automatically locating it relative to the AGV 1402 and the lower end of a fastener on which the collar installation EE 1412 is to install a collar.

Like the upper, or first EE 1310 of FIG. 13, each of the back-up EE 1408 and the collar installation EE 1412 can be provided with an integrated mechanism for automatically locating the EE 1408 or 1412 relative to the selected area on the underlying wing structure or fastener end, and can comprise, for example a vision/laser system of the type discussed above that communicates with their respective EE positioning mechanisms 1410 or 1414 and/or the AGV 1402 to position them precisely relative to their respective work objects.

As discussed above in connection with FIGS. 11A and 12, in some advantageous embodiments, the back-up EE 1408 can incorporate a sensor 1416, such as load cell, for sensing the magnitude of the clamping force exerted on a skin panel and an underlying wing support structure disposed between the first or upper EE 1310 and the back-up EE 1408, and as further discussed above, the output signal of the sensor 1012 can be fed back, e.g., wirelessly, to an interactive force feedback system (IFFS), which can be located anywhere in the system 1300, and used by that system to automatically control the bilateral clamping forces exerted by the respective EEs 1310 and 1408 on a skin panel and underlying wing structure to a level sufficient to the close any gap between the parts, and below a level of force that could result in damage to the skin panel. The clamping force desired is a function of the hole diameter, as drilling thrust force varies with the hole diameter being drilled. The clamping pressure is applied from the first or upper EE 1310. The back-up EE 1408 is disposed in contact and locked on the structure surface 1004, and is also measuring the force with sensor 1012 (see FIG. 11A). In practice, the closure force is variable, and is determined by the force profile in FIG. 12. When the force profile is non-linear, the closure force is determined. The hole diameter being drilled is known, so the expected drill thrust force is known. The total clamp force applied is the gap closure force+drill thrust force.

The MACIS can also include other advantageous features, such as a bowl mechanism 1418 for automatically feeding fastener collars to the collar installation EE 1412 seriatim, i.e., one at a time.

As those of some skill will by now appreciate, and depending on the particular application at hand, many modifications, substitutions and variations can be made in and to the materials, apparatus, configurations and methods of making and using the automated assembly systems of the present disclosure without departing from the spirit and scope thereof. In light of this, the scope of the present invention should not be limited to those of the particular embodiments illustrated and described herein, as they are merely by way of some examples thereof, but rather, should be fully commensurate with that of the claims appended hereafter and their functional equivalents.

What is claimed is:

1. A system, comprising:
 a first end effector configured to:
   press a selected area of an aircraft wing skin panel against a corresponding area of an underlying wing support structure with a downward force;
   drill a hole within the selected area, the hole extending through the skin panel and the support structure; and
   insert an elongated shaft of a fastener into the hole; and
 a first mechanism configured to locate the first end effector relative to the selected area;
 a second end effector configured to:
   start a collar of the fastener onto a lower end of the elongated shaft;
   advance the collar axially along the shaft and to a position clamped against the support structure; and swage the collar so as to lock the collar in the clamped position; and a second mechanism configured to locate the second end effector relative to the lower end of the shaft.

2. The system of claim 1, further comprising at least one stand configured to support an aircraft wing in a selected one of a plurality of generally horizontal positions.

3. The system of claim 1, further comprising:
a positioner disposed above the wing; and
a drilling head disposed on the positioner for movement relative to the positioner, the first end effector being disposed on the drilling head for movement relative to the drilling head.

4. The system of claim 1, wherein at least one of the mechanisms comprises a vision/laser system.

5. The system of claim 1, further comprising:
a third end effector configured to press the corresponding area of the support structure against the selected area of the skin panel with an upward force that is opposite in direction to the downward force; and
a third mechanism configured to locate the third end effector relative to the corresponding area of the support structure.

6. The system of claim 5, wherein the third mechanism comprises a vision/laser system.

7. The system of claim 5, further comprising:
a sensor configured to sense a magnitude of a clamping force exerted on the skin panel and the support structure between the first end effector and the third end effector; and
an interactive force feedback system (IFFS) configured to adjust the magnitude of the clamping force so as to close a gap between the selected area of the skin panel and the corresponding area of the support structure.

8. The system of claim 7, wherein the sensor comprises a load cell or a strain gauge.

9. A system, comprising:
an autonomous guided vehicle (AGV) configured to move over a surface disposed below an aircraft wing;
a navigation system configured to sense a position of the AGV relative to a selected position below the wing and to guide the AGV to the selected position;
a first end effector disposed on the AGV and configured to press a selected area of a support structure of the wing against a corresponding area of a skin panel of the wing with an upward force;
a first positioner disposed on the AGV and configured to sense the position of the first end effector relative to the selected area of the support structure and to locate the first end effector relative to the selected area;
a second end effector disposed on the AGV and configured to start a collar onto a lower end of a fastener located within the selected area and extending through the skin panel and the support structure, advance the collar axially along the fastener and to a position clamped against the support structure, and swage the collar so as to lock the collar in the clamped position; and
a second positioner disposed on the AGV and configured to sense the position of the second end effector and locate the second end effector relative to the lower end of the fastener.

10. The system of claim 9, further comprising a mechanism configured to feed fastener collars to the second end effector seriatim.

11. The system of claim 9, further comprising:
a sensor configured to sense a magnitude of a clamping force exerted on the skin panel and the support structure between the first end effector and a third end effector pressing the corresponding area of the skin panel against the selected area of the support structure with a downward force that is opposite in direction to the upward force; and
an interactive force feedback system (IFFS) configured to adjust the magnitude of the clamping force so as to close a gap between the selected area of the skin panel and the corresponding area of the support structure.

12. A method, comprising:
using a first end effector to:
press a selected area of wing skin panel against a corresponding area of an underlying wing support structure with a downward force;
drill a hole within the selected area, the hole extending through the skin panel and the support structure; and
insert an elongated shaft of a fastener into the hole; and
using a second end effector to:
start a collar of the fastener onto a lower end of the elongated shaft;
advance the collar axially along the shaft and to a position clamped against the support structure; and
swage the collar so as to lock the collar in the clamped position.

13. The method of claim 12, further comprising using a third end effector to press the corresponding area of the support structure against the selected area of the skin panel with an upward force that is opposite in direction to the downward force.

14. The method of claim 13, further comprising:
sensing a magnitude of a clamping force exerted on the skin panel and the underlying structure between the first end effector and the third end effector; and
adjusting the magnitude of the clamping force so as to close a gap between the selected area of the skin panel and the corresponding area of the support structure without damaging the skin panel.

15. The method of claim 14, further comprising deburring upper and lower ends of the hole after the gap has been closed.

* * * * *